(12) United States Patent
Friesen

(10) Patent No.: US 11,142,113 B2
(45) Date of Patent: Oct. 12, 2021

(54) FRACTURING SAND DUMP TRAILER

(71) Applicant: Midland Manufacturing Limited, Rosenort (CA)

(72) Inventor: Leroy J. Friesen, Rosenort (CA)

(73) Assignee: MIDLAND MANUFACTURING LIMITED, Rosenort (CA)

( * ) Notice: Subject to any disclaimer, the term of this patent is extended or adjusted under 35 U.S.C. 154(b) by 178 days.

(21) Appl. No.: 16/602,034

(22) Filed: Jul. 26, 2019

(65) Prior Publication Data

US 2021/0023975 A1    Jan. 28, 2021

(51) Int. Cl.
*B60P 1/56*    (2006.01)

(52) U.S. Cl.
CPC ..................... *B60P 1/56* (2013.01)

(58) Field of Classification Search
CPC ...... B60P 1/56; B60P 3/16; B60P 3/41; B60P 7/12; B60P 1/16; B60P 1/28
USPC ...... 298/29, 8 H, 24, 35 R, 27, 30, 23 R, 33, 298/25, 1 B, 31, 38, 23 A, 37
See application file for complete search history.

(56) References Cited

U.S. PATENT DOCUMENTS

| | | |
|---|---|---|
| 4,236,458 A | 12/1980 | Varda |
| 4,733,451 A | 3/1988 | Voight |
| 5,131,722 A * | 7/1992 | DeCap ............ B60P 1/56 222/502 |
| 5,294,186 A | 3/1994 | DeCap |
| 5,324,097 A | 6/1994 | DeCap |
| 6,217,122 B1 * | 4/2001 | Kirbie ............ B60P 1/16 298/12 |
| 6,416,133 B2 | 7/2002 | Friesen |
| 6,749,268 B1 * | 6/2004 | Wheeler ............ B60P 1/56 298/29 |
| 8,182,046 B1 | 5/2012 | Hauth |
| 9,656,799 B2 * | 5/2017 | Oren ............ B65D 88/12 |
| 2018/0257857 A1 | 9/2018 | Fisher |

* cited by examiner

*Primary Examiner* — D Glenn Dayoan
*Assistant Examiner* — Sunsurraye Westbrook
(74) *Attorney, Agent, or Firm* — Paul Sharpe; The Sharpe Group

(57) ABSTRACT

A trailer for particulates, especially for fracturing sand, but also for other materials, has a clam shell gate, which sealingly engages when closed preventing egress of particulates. The gate is attached to a hopper which has an exterior control mechanism thus avoiding wear and tear from particulates. The hopper is an inverted pyramid with downward and inward inclined walls below the trailer. The trailer itself has a cargo compartment with forward and rear sloping walls and upright side walls. The sloping walls of the trailer and the inclined walls of the hopper are inclined at about 38° to the horizontal, which is greater than the angle of repose of fracturing sand to allow complete or near complete discharge of fracturing sand.

21 Claims, 2 Drawing Sheets

FRACTURING SAND DUMP TRAILER

The invention is directed to a dump trailer for fracturing sand, having a clam shell hopper.

BACKGROUND

Fracturing sand is round grains of silica, such as quartz, with particle size between 0.1 and 2 mm, more typically between 0.4 and 0.8 mm in size, sometimes between 0.15 and 0.6 mm different size ranges may be specified by customers. Typically, hopper gates consist of a plate which blocks the outlet, when closed, and which is slid or rotated out of the way to open the outlet, which may be horizontal or vertical. Thus far few satisfactory hopper gates for fracturing sand exist. The reason is that fracturing sand is very fine, flows like a liquid and gets into the gate mechanism often making it difficult or impossible to operate. It is also abrasive being silica, often quartz, particles, which wear or erode the gate elements In general, fracturing sand trailers are related to grain or gravel or seed trailers, often are in fact adapted grain or gravel or seed trailers and have a bottom hopper arrangement, although some have side outlets.

The instant trailer is being developed at the request of clients who are dissatisfied with currently available fracturing sand trailers.

The angle of repose is variously stated as around 34° for dry sand, of which fracturing sand is one form. Specifically designed fracturing trailers have inclined surfaces of 37 or 38°, and the clients requested at least about 38° to ensure complete or near complete dumping of the fracturing sand.

PRIOR ART

There are United States Patents to dump trailers with clam shell discharge hoppers. U.S. Pat. No. 4,236,458, 2 Dec. 1980 to Varda shows a longitudinal clam shell hopper for a rail coal car. U.S. Pat. No. 4,733,451, 29 Mar. 1988 to Voight shows a clam shell hopper for a dump trailer, no details of the precise clam shell arrangement are given. U.S. Pat. No. 5,131,722, 21 Jul. 1992, U.S. Pat. No. 5,294,186, 15 Mar. 1994 and U.S. Pat. No. 5,324,097, 28 Jun. 1994 all to DeCap all state "the position of the door relative to the edge (22A) is arranged such that the repose angle of the material acts to keep the material restrained within the hopper bottom and above the door surfaces," (col. 4 lines 14 to 23) in U.S. Pat. No. 5,131,722; (col. 4 lines 4 to 7) in U.S. Pat. No. 5,294,186 and (col. 4, lines 12 to 15) in U.S. Pat. No. 5,324,097. This arrangement would not work with fracturing sand which flows like a liquid. U.S. Pat. No. 6,416,133, 9 Jul. 2002, to Friesen (instant applicant) for a clam shell hopper for a dump trailer similarly shows a hopper which is not sealed by the clam shell gates, as seen in FIG. 2. U.S. Pat. No. 8,182,046, 22 May 2012 to Hauth shows a clam shell hopper for a dump trailer likewise has clam shell gates that do not seal the hopper gate shown in FIGS. 2A, 2B, 3A, 4B and 5A. The only Published Patent Application is 2001/0002766, 7 Jun. 2001, which corresponds to U.S. Pat. No. 6,416,133 to Friesen noted above.

There are also United States Patent and Published Patent Applications to containers, usually transported and discharged on a trailer, with hoppers for transporting fracturing sand. U.S. Pat. No. 8,668,430, 11 Mar. 2014, to Oren, shows a container hopper with a horizontal sliding gate. U.S. Pat. No. 8,915,691, 23 Dec. 2014, to Mintz, shows a container hopper with a horizontal transverse sliding gate. U.S. Pat. No. 9,428,330, 30 Aug. 2016, to Lopez, shows a container hopper with a horizontal knife gate or knife gate valve. U.S. Pat. No. 9,511,929, 6 Dec. 2016, to Oren shows a container hopper with a hinged bottom flap. U.S. Pat. No. 9,617,066, 11 Apr. 2017, to Oren shows a container with a vertical side slide gate. U.S. Pat. No. 9,638,337, 2 May 2017, to Witkowski, shows a plug valve suitable for use with fracturing sand. U.S. Pat. No. 9,688,469, 27 Jun. 2017, to Sheesley shows a container hopper having a lower sliding gate. U.S. Pat. No. 9,718,610, 1 Aug. 2017, to Oren shows a container hopper having a horizontal gate raised vertically from the discharge outlet. U.S. Pat. No. 9,758,081, 12 Sep. 2017, to Oren shows a container hopper with an undefined discharge outlet. U.S. Pat. No. 9,758,082, 12 Sep. 2017, to Eiden III shows a container hopper with a slide gate and control plate. U.S. Pat. No. 9,790,022, 17 Oct. 2017, to Sheesley shows a container hopper with a lower sliding gate. U.S. Pat. No. 9,862,551, 9 Jan. 20128, to Oren shows a container hopper with a horizontally movable flow gate. United States Published Patent Application No. 20180257857, 10 Mar. 2017, to Fisher shows a container hopper having a bottom gate which may be a ladder gate, an iris gate or a clamshell gate. No. 20190084468, 21 Mar. 2019, to Teichrob, shows a trainer hopper which may have a bottom hatch such as a butterfly valve.

There are Canadian Patents to similar trailers. Canadian Patent No. 2180054, published 31 Dec. 1996, to Heider, shows a trailer with a trapezoidal carrying compartment having an inverted pyramidal hopper with a sliding bottom discharge door. Canadian patent No. 2,492,675 shows a similar arrangement with two hoppers both having sliding bottom discharge doors.

SUMMARY OF THE INVENTION

A principal object of the invention is to provide a clam shell gate for attachment to a hopper of a trailer for particulates. The gate comprises paired opposed side walls and paired opposed end walls. These end and side walls have bottom edges. Clam shell plates are pivotally mounted in the end walls, and the clam shell plates are pivotally movable between an open position and a closed position. The clam shell plates in closed position sealingly engage each other and the bottom edges of the side and end walls to prevent egress of particulates through the gate. Most preferably the gate has a gate operating mechanism exterior to said gate, whereby the gate operating mechanism is isolated from said particulates, and this gate operating mechanism is adapted to move the clam shell plates between said closed and open positions. Preferably the bottom edges of the end walls are arcuate, and the clam shell plates sealingly engage the arcuate edges of the end walls to prevent egress of particulates through the gate. More preferably the clam shell plates are pivotally mounted on shafts protruding from the end walls. The clam shell plates are preferably pivotally mounted on shafts protruding from a channel member attached to the end walls. The clam shell plates may be mounted on supporting arms which are pivotally mounted on the shafts. Preferably the supporting arms adjacent each end wall have teeth on each supporting arm which engage teeth on the other supporting arm. More preferably the end and side walls have coplanar top edges and a flange projects outward from these top edges, and the flange has spaced apart apertures for fasteners to attach the gate to the hopper. Most preferably the bottom edges of the end walls are arcuate and the clam shell plates sealingly engage the arcuate edges of the end walls to prevent egress of particulates through the gate and; the clam shell plates are mounted on supporting arms which are pivotally mounted on shafts protruding from the end walls, and the supporting arms adjacent each end wall have teeth on each supporting arm which engage teeth on the other supporting arm, and the end and side walls have coplanar top edges and a flange projects outward from the top edges, and the flange has spaced apart apertures for fasteners to attach the gate to the hopper.

A further object of the invention is to provide a hopper for a trailer for particulates forming an inverted pyramid below the trailer, the hopper has inwardly and downwardly inclined walls meeting at a bottom rectangular aperture and the gate described above is attached below the bottom rectangular aperture. Preferably the hopper has a gate operating mechanism exterior to the gate mounted exterior to the hopper, whereby the gate operating mechanism is isolated from the particulates, and the gate operating mechanism is adapted to move the clam shell plates between closed and open positions. Preferably the gate operating mechanism comprises a control arm pivotally mounted by a pivot pin in a bracket attached to the hopper, a first end of the control arm is attached to an outer edge of one clam shell plate, and a second end of the control arm is attached to a piston rod of a pneumatic cylinder mounted on the hopper, whereby when the piston rod is extended the clam shell plate is moved into closed position, and when the piston rod is retracted the clam shell plate is moved to open position. Preferably the hopper comprises a horizontal reinforcing element around the hopper above the gate and below the trailer. Preferably the hopper has a bottom flange projecting outward from its bottom rectangular aperture and this flange has spaced apart apertures to receive fasteners, and the end and side walls of the gate have coplanar top edges and a top flange projects outward from these top edges, and the top flange has spaced apart apertures for fasteners to attach the gate to the hopper, and fasteners attach the bottom flange of the hopper to the top flange of the gate. A subsidiary object of the invention is to provide a gate operating mechanism for the gate which comprises a control arm, a first end of the control arm being attached to an outer edge of one clam shell plate, and a second end of the control arm being fixedly mounted on a rotatable shaft, the shaft being journally mounted in shaft support brackets attached to the hopper and at least one lever having a handle attached to the shaft, the shaft and the control arm being rotatable between a first position wherein the clam shell gate is closed and a second position wherein the clam shell gate is open. Preferably locking means is provided to lock the rotatable shaft and the clam shell gate in closed position.

Another object of the invention is to provide a trailer for particulates comprising a chassis, longitudinal side walls extending along the chassis, and a front sloping wall, and a rear sloping wall, forming a first rectangular aperture, and a hopper forming an inverted pyramid, below the trailer chassis, the hopper has inwardly and downwardly inclined walls meeting at a second rectangular aperture and a clam shell gate as described above attached to the bottom of the hopper. Most preferably the hopper comprises a gate operating mechanism exterior to the gate, mounted exterior to the hopper, whereby the gate operating mechanism is isolated from the particulates, and the gate operating mechanism being adapted to move the clam shell plates between the closed and open positions. Preferably the gate operating mechanism comprises a control arm pivotally mounted by a pivot pin in a bracket attached to the hopper, a first end of the control arm is attached to an outer edge of one clam shell plate, and a second end of the control arm is attached to a piston rod of a pneumatic cylinder mounted on the hopper, whereby when the piston rod is extended the clam shell plate is moved into closed position, and when the piston rod is retracted the clam shell plate is moved to open position. Preferably the sloping walls of the trailer and the inclined walls of the hopper are inclined at about 38° to the horizontal. Preferably the hopper has a bottom flange projecting outward from the bottom rectangular aperture and this flange has spaced apart apertures to receive fasteners and the end and side walls of the gate have coplanar top edges and a top flange projects outward from these said top edges, and the top flange has spaced apart apertures for fasteners to attach the gate to the hopper, and fasteners attach the bottom flange of the hopper to the top flange of the gate. Preferably the hopper comprises a horizontal reinforcing element around the hopper above the gate and below the trailer. A subsidiary object of the invention is to provide a gate operating mechanism for the gate which comprises a control arm, a first end of the control arm being attached to an outer edge of one clam shell plate, and a second end of the control arm being fixedly mounted on a rotatable shaft, the shaft being journally mounted in shaft support brackets attached to the hopper and at least one lever having a handle attached to the shaft, the shaft and the control arm being rotatable between a first position wherein the clam shell gate is closed and a second position wherein the clam shell gate is open. Preferably locking means is provided to lock the rotatable shaft and the clam shell gate in closed position.

DESCRIPTION OF THE PREFERRED EMBODIMENTS

Figure 1:
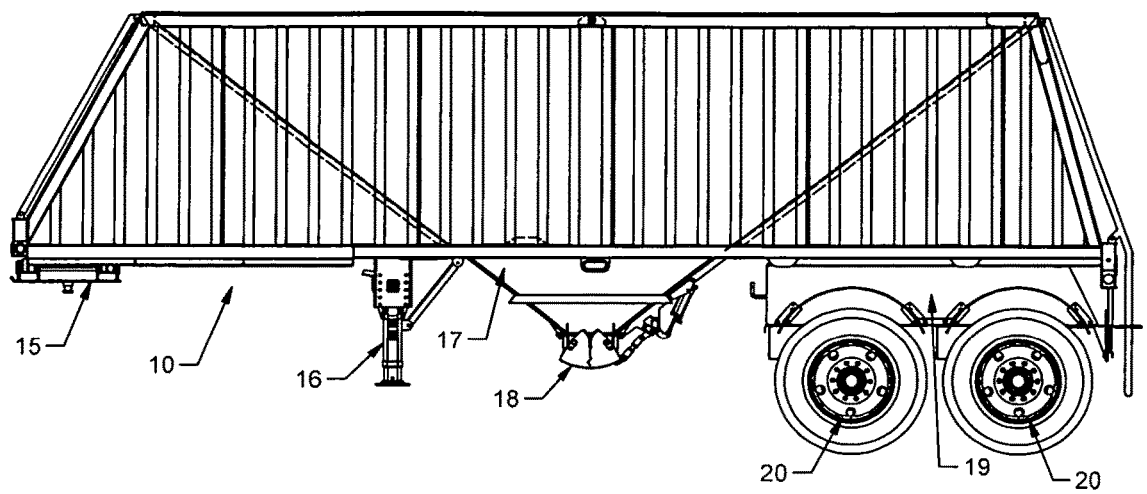
FIG. 1 shows a general side elevational view of a trailer of the invention. [0010] [0010]

The trailer of the invention is indicated by numeral 10 in FIG. 1. Trailer 10 has corrugated metal side 11 and internal sloping walls, front 12 and rear 13 indicated by broken lines, these walls are preferably at 38° to the horizontal, angles from 31° and upwards are indicated in the art, but our clients requested 38°. The trailer has chassis 14, fifth wheel 15, landing gear 16, hopper 17, gate 18, suspension box 19 and wheels 20. The trailer is typically 27 to 28 feet long (about 8.2 to about 8.5 metres), 8.5 feet across (about 2.6 metres) and 6.5 feet or more high (about 2 metres or more), the hopper itself is 83 inches front to rear (about 2.1 metres) and 37 inches deep from chassis to bottom of the gate (about 1 metre). The capacity of the trailer is about 65 cubic feet. (1.85 cubic metres). Fracturing sand has a density of 1.54 giving a weight capacity of about 3 metric tons.

Figure 2:
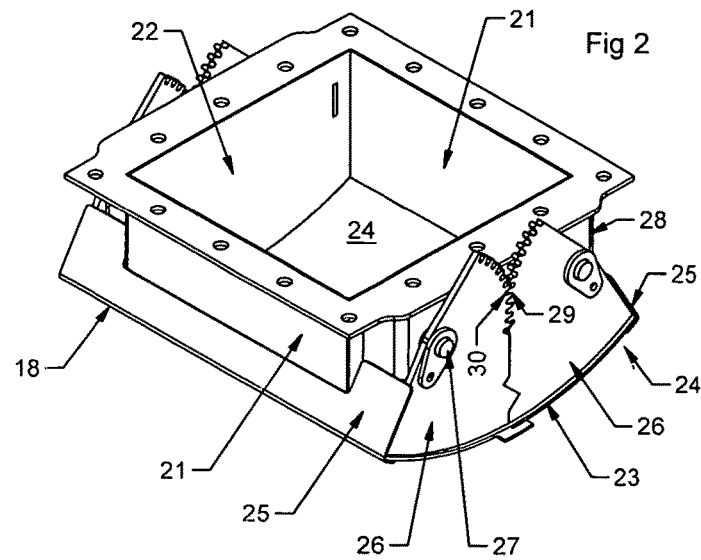
FIG. 2 shows a perspective view of a gate of the invention.

In FIG. 2, gate 18 has side walls 21, end walls 22, and clam shell gate plates 23, sealingly engage each other. Gate plate 23 have bottom plates 24, side plates 25, support arms 26, pivoted about gate pins 27, which are mounted on channel bracket 28. Support arms 26 have geared teeth 29 and 30, which mesh.

Figure 3:
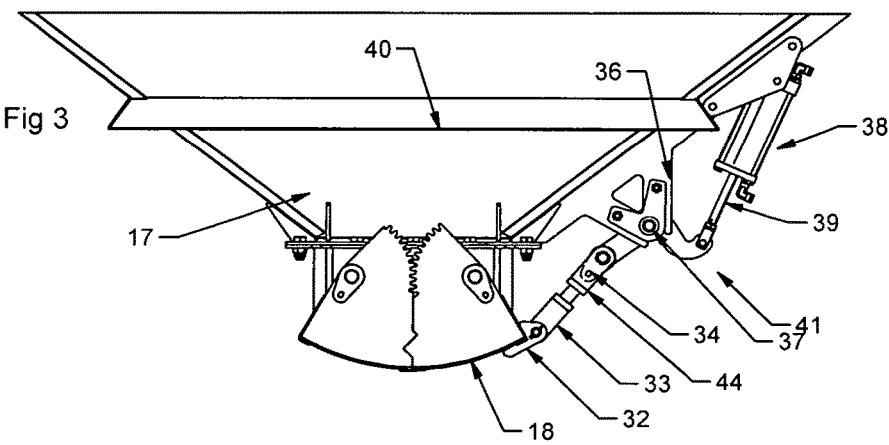
FIG. 3 shows a detailed side view of the gate and hopper of the invention.
Figure 4:
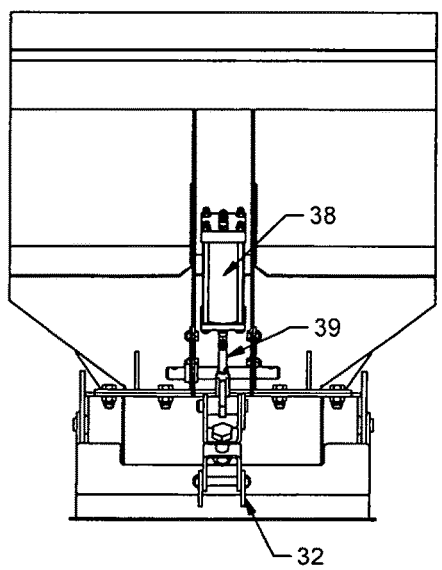
FIG. 4 shows a rear view of the gate and hopper of the invention.

In FIG. 3, the bottom of hopper 17 is shown with gate 18. A control arm 31, which has lower linkage bracket 32, lower linkage arm 33, pivot pin 34 upper linkage arm 41 is pivoted about linkage pin 37 mounted in linkage pin bracket 36. Upper linkage arm 36 is connected to pneumatic cylinder 38 by pivot pin 35 and piston rod 39. Retraction of piston rod 39 opens shell clam gate 18 extension closes it. Pneumatic cylinder 38 is operably linked to the trailer pneumatic system. Reinforcing element or rim 40 supports hopper 17. FIG. 4 shows the bottom of hopper 17 from the rear.

Figure 5:
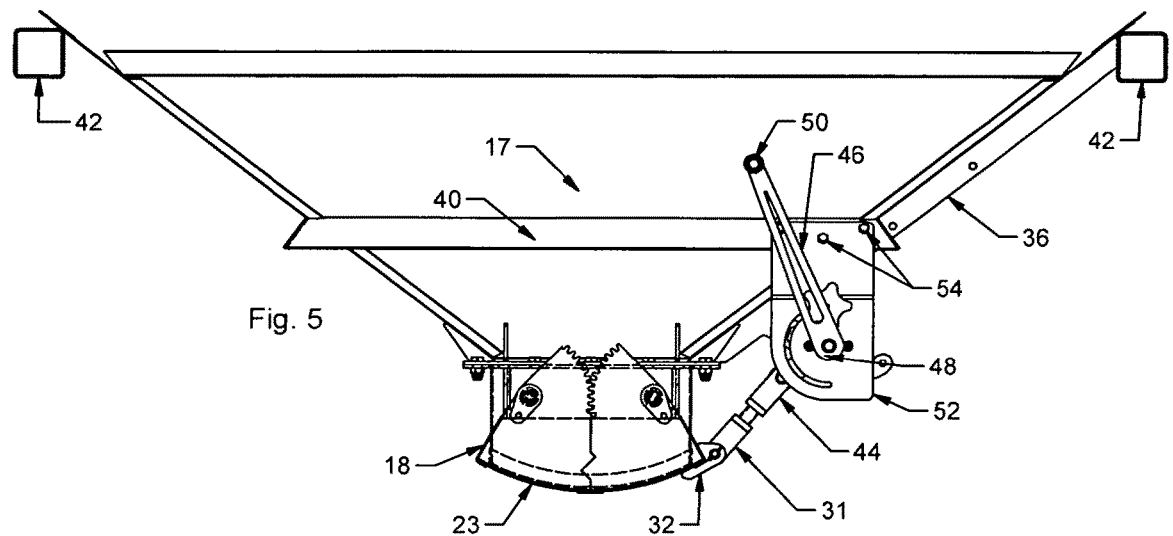
FIG. 5 shows a side view of another gate and hopper of the invention.
Figure 6:
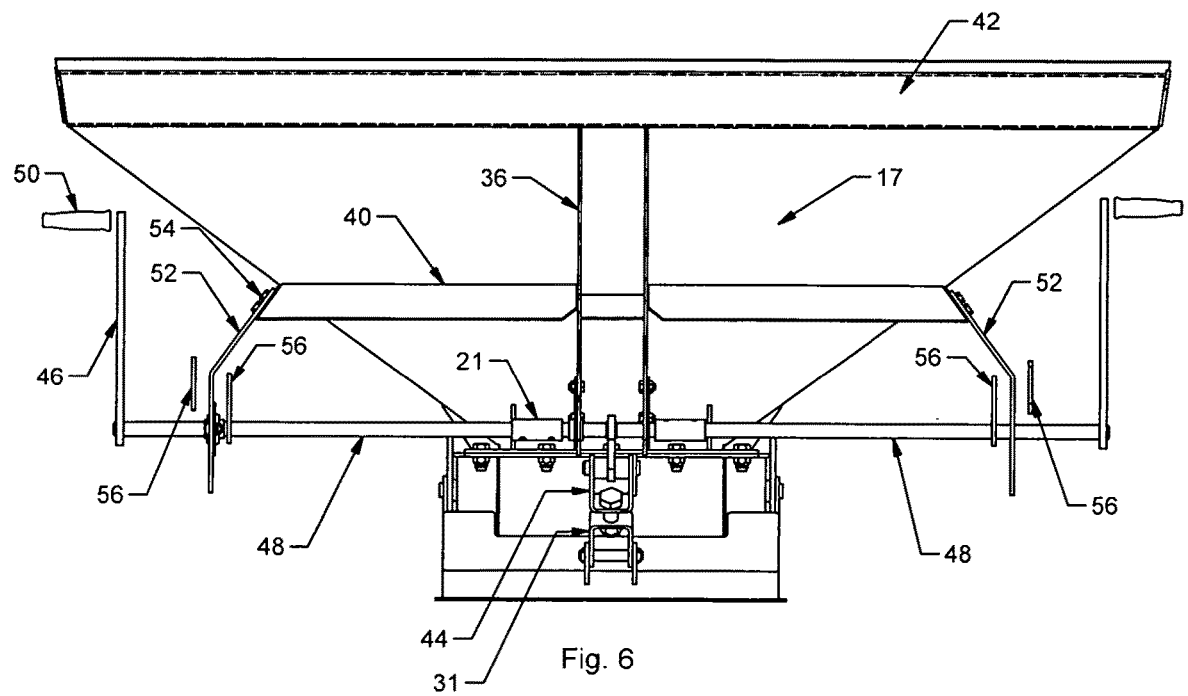
FIG. 6 shows a front view of the gate and hopper of FIG. 5.

A second preferred embodiment is shown in FIGS. 5 and 6. Hopper 17 has attached gate 18 at its bottom. Hopper 17 is supported by square tubular cross members 42 of chassis 14 (4 inches or about 10 cm square). Gate plates 23 shown in closed position are pivotally moveable between closed position and open position by control arm 31, including linkages 44, fixedly attached to long shaft 48 rotatable by levers 46 and attached handles 50. Shaft 48 is journaled through shaft support brackets 52 attached to reinforcing element 40 by fasteners 54. Locking brackets 56 are mounted on shaft 48 on either side of support brackets 52. Apertures are provided in locking brackets 56 and support brackets 56, which are aligned when gate 18 and gate plates 23 are in closed position. The gate 18 and gate plates 23 are secured in closed position by passing fasteners typically nuts and bolts through the apertures, thus preventing leakage of fracturing sand through the gate. As those skilled in the art are aware numerous locking means can be employed to secure the gate in closed position.

As those skilled in the art realize these preferred, disclosed and described details and materials and components can be subjected to substantial variation, modification, change, alteration and substitution without affecting or modifying the function of the described embodiments. Although specific embodiments of the invention are described above, it is not limited thereto. Numerous modifications and variations fall within the scope of the claimed, disclosed and described invention, as interpreted in the light of natural laws of science and engineering as understood by persons skilled in the art.

I claim:

1. A clam shell gate for attachment to a hopper of a trailer for particulates, said gate comprising paired opposed side walls and paired opposed end walls; and said paired opposed end walls and said paired opposed side walls having bottom edges;
   clam shell plates pivotally mounted in said end walls, said clam shell plates being pivotally movable between an open position and a closed position, said clam shell plates being mounted on supporting arms, said supporting arms adjacent each end wall having teeth on each supporting arm which engage teeth on the other supporting arm; said clam shell plates in closed position sealingly engaging each other and said bottom edges of said paired opposed side walls and said paired opposed end walls to prevent egress of particulates through said gate.

2. The gate of claim 1 having a gate operating mechanism exterior to said gate, whereby said gate operating mechanism is isolated from said particulates, said gate operating mechanism being adapted to move said clam shell plates between said closed and open positions.

3. The gate of claim 1 wherein said bottom edges of said paired opposed end walls are arcuate and said clam shell plates sealingly engage said arcuate edges of said paired opposed end walls to prevent egress of particulates through said gate.

4. The gate of claim 1 wherein said clam shell plates are pivotally mounted on shafts protruding from said end walls.

5. The gate of claim 3 wherein said clam shell plates are pivotally mounted on shafts protruding from a channel member attached to said end walls.

6. The gate of claim 1, wherein said supporting arms are pivotally mounted on said shafts.

7. The gate of claim 1 wherein said paired opposed end walls and said paired opposed side walls have coplanar top edges having a flange projecting outwardly from said top edges, said flange having spaced apart apertures for fasteners to attach said gate to said hopper.

8. A hopper for a trailer for particulates forming an inverted pyramid below said trailer,
   said hopper having inwardly and downwardly inclined walls meeting at a bottom rectangular aperture and
   said gate member of claim 1 attached below said rectangular aperture.

9. A hopper of claim 8 said hopper having a gate operating mechanism exterior to said gate, mounted exterior to said hopper, whereby said gate operating mechanism is isolated from said particulates, said gate operating mechanism being adapted to move said clam shell plates between said closed and open positions.

10. A hopper of claim 9, wherein said gate operating mechanism comprises a control arm pivotally mounted by a pivot pin in a bracket attached to said hopper, a first end of said control arm being attached to an outer edge of one said clam shell plate, and a second end of said control arm being attached to a piston rod of a pneumatic cylinder mounted on said hopper, whereby when said piston rod is extended said clam shell plate is moved into closed position, and when said piston rod is retracted said clam shell plate is moved to open position.

11. A hopper of claim 10, wherein said hopper comprises a horizontal reinforcing element around said hopper above said gate and below said trailer.

12. A hopper of claim 11 wherein said hopper has a bottom flange projecting outward from said bottom rectangular aperture and said flange has spaced apart apertures to receive fasteners and said end and side walls of said gate have coplanar top edges and a top flange projects outward from said top edges and said top flange having spaced apart apertures for fasteners to attach said gate to said hopper, and fasteners attach said bottom flange of said hopper to said top flange of said gate.

13. A hopper of claim 9, wherein said gate operating mechanism comprises a control arm, a first end of said control arm being attached to an outer edge of one said clam shell plate, and a second end of said control arm being fixedly mounted on a rotatable shaft, said shaft being journally mounted in shaft support brackets attached to said hopper and at least one lever having a handle attached to said shaft, said shaft and said control arm being rotatable between a first position wherein said clam shell gate is closed and a second position wherein said clam shell gate is open.

14. A hopper of claim 13, wherein locking means is provided to lock said rotatable shaft and said clam shell gate in closed position.

15. A trailer of claim 14, wherein said gate operating mechanism comprises a control arm pivotally mounted by a pivot pin in a bracket attached to said hopper, a first end of said control arm being attached to an outer edge of one said clam shell plate, and a second end of said control arm being attached to a piston rod of a pneumatic cylinder mounted on said hopper, whereby when said piston rod is extended said clam shell plate is moved into closed position, and when said piston rod is retracted said clam shell plate is moved to open position.

16. A trailer of claim 15 wherein said hopper comprises a horizontal reinforcing element around said hopper above said gate and below said trailer.

17. A trailer for particulates comprising a chassis, longitudinal side walls extending along said chassis, and a front sloping wall, and a rear sloping wall, forming a first rectangular aperture, and a hopper forming an inverted pyramid, below said trailer chassis, said hopper having inwardly and downwardly inclined walls meeting at a second rectangular aperture and a clam shell gate of claim 1 attached to the bottom of said hopper.

18. A trailer of claim 17 wherein said sloping walls of said trailer and said inclined walls of said hopper are inclined at about 38° to the horizontal.

19. A trailer of claim 17 wherein said hopper has a bottom flange projecting outward from said bottom rectangular aperture and said flange has spaced apart apertures to receive fasteners and said end and side walls of said gate have coplanar top edges and a top flange projects outward from said top edges and said top flange having spaced apart apertures for fasteners to attach said gate to said hopper, and fasteners attach said bottom flange of said hopper to said top flange of said gate.

20. A trailer including a hopper for particulates comprising a gate operating mechanism exterior to said gate, mounted exterior to said hopper, whereby said gate operating mechanism is isolated from said particulates, said gate operating mechanism being adapted to move said clam shell plates between said closed and open positions, said gate comprising paired opposed side walls and paired opposed end walls; and said opposed end walls and paired opposed side walls having bottom edges and clam shell plates pivotally mounted in said end walls, said clam shell plates being pivotally movable between an open position and a closed position, said gate operating mechanism having a control arm, a first end of said control arm being attached to an outer edge of one said clam shell plate, and a second end of said control arm being fixedly mounted on a rotatable shaft, said shaft being journally mounted in shaft support brackets attached to said hopper and at least one lever having a handle attached to said shaft, said shaft and said control arm being rotatable between a first position wherein said clam shell gate is closed and a second position wherein said clam shell gate is open.

21. A trailer of claim 20, wherein locking means is provided to lock said rotatable shaft and said clam shell gate in closed position.

* * * * *